US006079442A

United States Patent [19]
Raymond, Jr. et al.

[11] Patent Number: 6,079,442
[45] Date of Patent: Jun. 27, 2000

[54] VALVE ACTUATOR

[75] Inventors: Frank Jo Raymond, Jr.; Michael John Bertoja; Francis William Johnston; David Wayne Gent, all of Houston, Tex.

[73] Assignee: Bray International, Inc., Houston, Tex.

[21] Appl. No.: 08/938,339

[22] Filed: Sep. 26, 1997

Related U.S. Application Data

[62] Division of application No. 08/603,785, Feb. 20, 1996.

[51] Int. Cl.$^7$ .............................. F16K 31/05; F16K 31/53
[52] U.S. Cl. .................. 137/554; 74/412 TA; 74/421 A; 74/423; 74/425; 74/625; 251/129.12; 251/248; 251/249.5; 251/129.03
[58] Field of Search ................................ 74/412 TA, 420, 74/421 A, 423, 425, 625; 251/129 B, 129.11, 129.12, 129.13, 248, 249.5; 137/553, 554, 556

[56] References Cited

U.S. PATENT DOCUMENTS

| | | | |
|---|---|---|---|
| 3,170,339 | 2/1965 | Plume | 251/129.12 |
| 3,416,566 | 12/1968 | Anderson | 137/554 |
| 3,452,766 | 7/1969 | Fenster | 137/556 |
| 4,261,224 | 4/1981 | Sulzer | 74/626 |
| 4,454,504 | 6/1984 | Jocz | 340/665 |
| 4,494,565 | 1/1985 | Sinclair et al. | 137/556 |
| 4,494,566 | 1/1985 | Sinclair et al. | 137/556 |
| 4,497,340 | 2/1985 | Gain, Jr. | 137/556 |
| 4,759,224 | 7/1988 | Charbonneau et al. | 137/552 |
| 4,759,386 | 7/1988 | Grouw, III | 251/129.12 |
| 4,760,989 | 8/1988 | Elliott et al. | 251/129.12 |
| 4,926,903 | 5/1990 | Kawai | 137/554 |
| 5,052,424 | 10/1991 | Zerndt et al. | 251/129.12 |
| 5,178,187 | 1/1993 | Raymond, Jr. et al. | 137/556 |
| 5,179,974 | 1/1993 | Taniguchi | 137/554 |
| 5,305,781 | 4/1994 | Raymond, Jr. et al. | 137/554 |
| 5,536,698 | 7/1996 | Trevisan | 137/556 |
| 5,564,677 | 10/1996 | Levy et al. | 137/554 |

FOREIGN PATENT DOCUMENTS

| | | |
|---|---|---|
| 0380787 | 8/1992 | European Pat. Off. . |
| 2250141B | 4/1974 | Germany . |
| 2344547A | 3/1975 | Germany . |
| 2417057A | 10/1975 | Germany . |
| 0939353 | 2/1962 | United Kingdom . |
| 1020395 | 1/1965 | United Kingdom . |
| 2265204 | 3/1993 | United Kingdom . |
| 2265204 | 9/1993 | United Kingdom . |

OTHER PUBLICATIONS

Brochure entitled "*L120 Series Electric Valve Actuators*", Limitorque, Bulletin 120–10000, Issue Sep. 1990.
Brochure entitled "*Series 2000 Electric Actuator:* Quarter Turn", EIM Controls, E–791, pp. 1–9.
Brochure entitled "*Rotork 'A' Range Double Sealed 3–Phase Electric Valve Actuators*", Rotork Actuation, Publication E21OE Issue Feb. 1993, pp. 3–15.
Brochure entitled "*Actuators, Auma Norm, SA 07.1—SA 48.1*" Auma Benelux B.V.
Brochure entitled "*Keystone F777 Electric Actuator*", Keystone The Flow Control Company.
British Search Report for U.K. Application GB 9828220.5 dated Apr. 29, 1999.
British Search Report for U.K. Application GB 9901048.0 dated Apr. 30, 1999.

*Primary Examiner*—George L. Walton
*Attorney, Agent, or Firm*—Browning Bushman

[57] ABSTRACT

There is disclosed an actuator for a rotary valve, such as a butterfly valve which rotates a quarter of a turn between open and closed positions. The actuator includes a drive mechanism releasably attachable to the stem of the valve for rotating it in response to operation of a reversible electric motor.

9 Claims, 8 Drawing Sheets

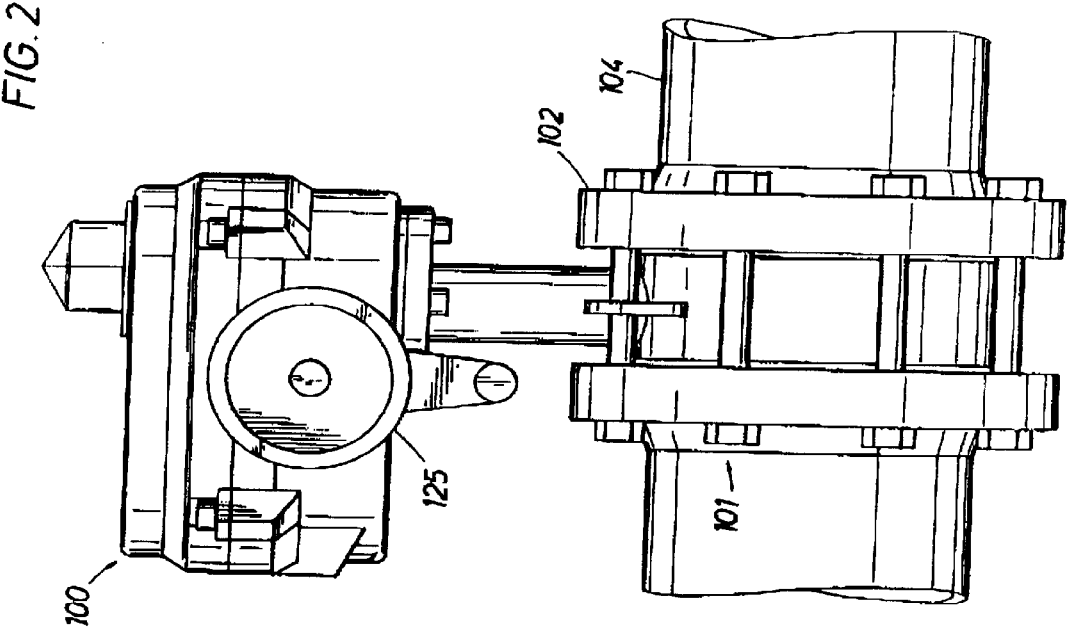
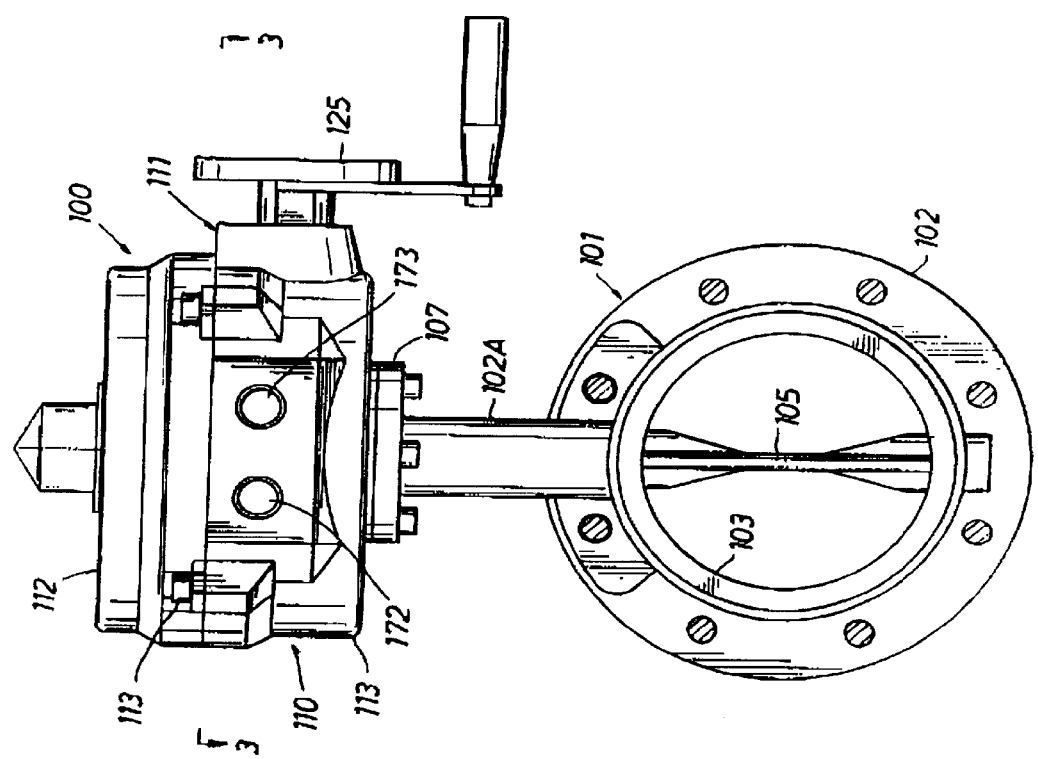

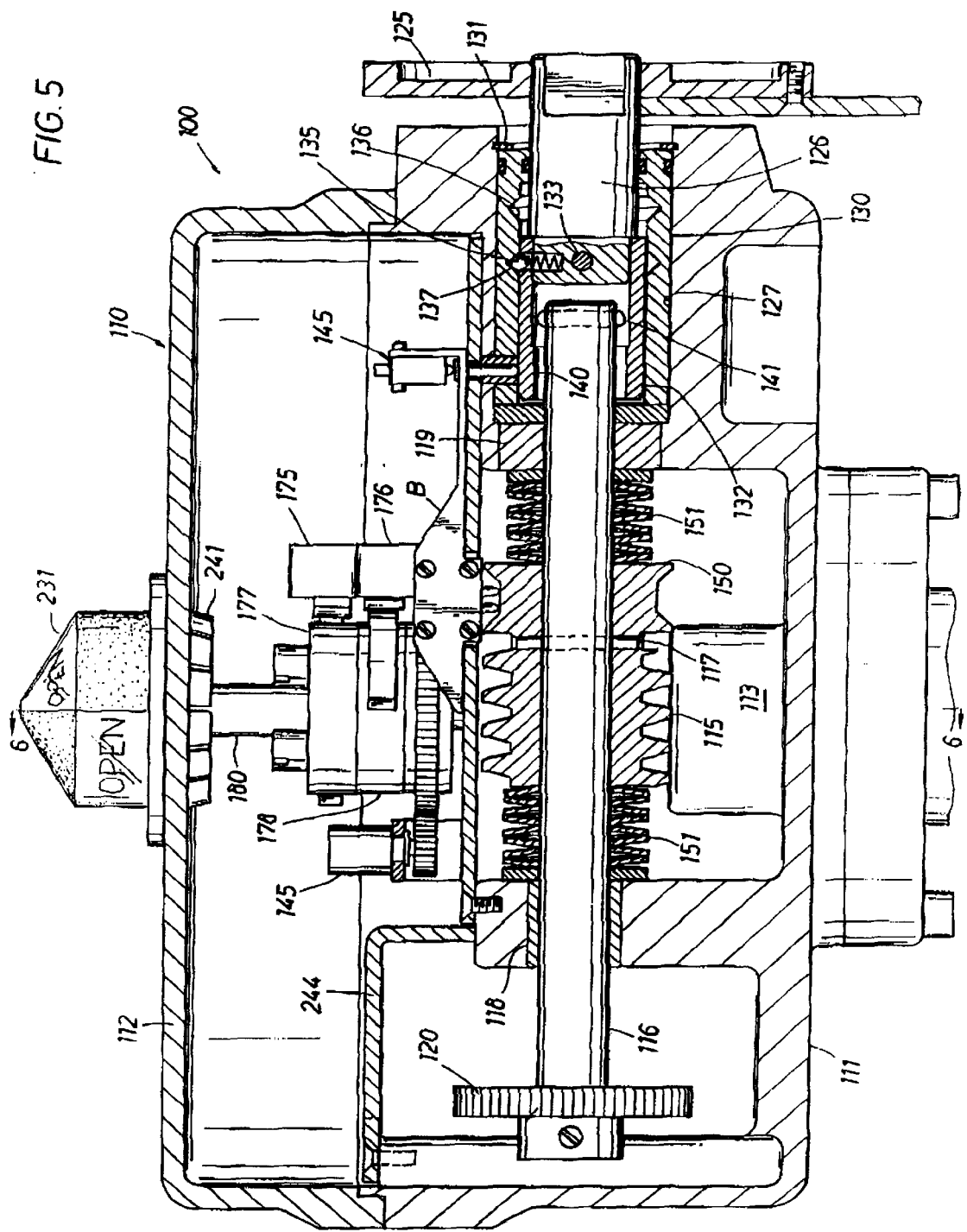

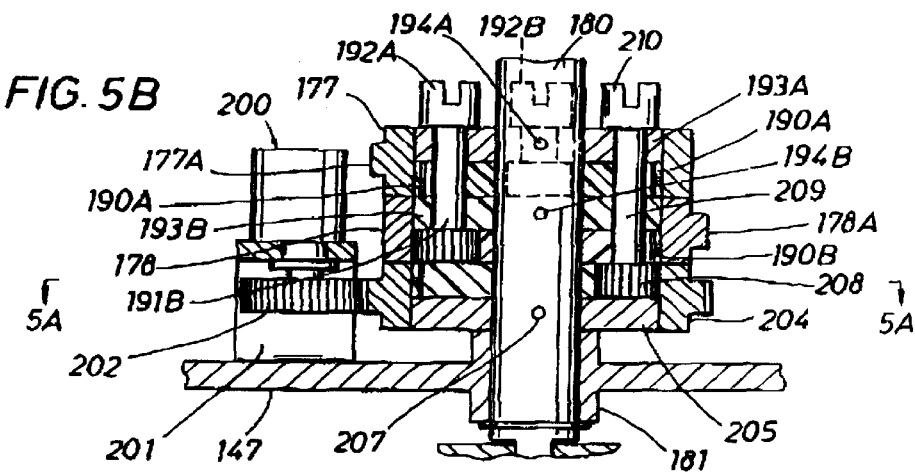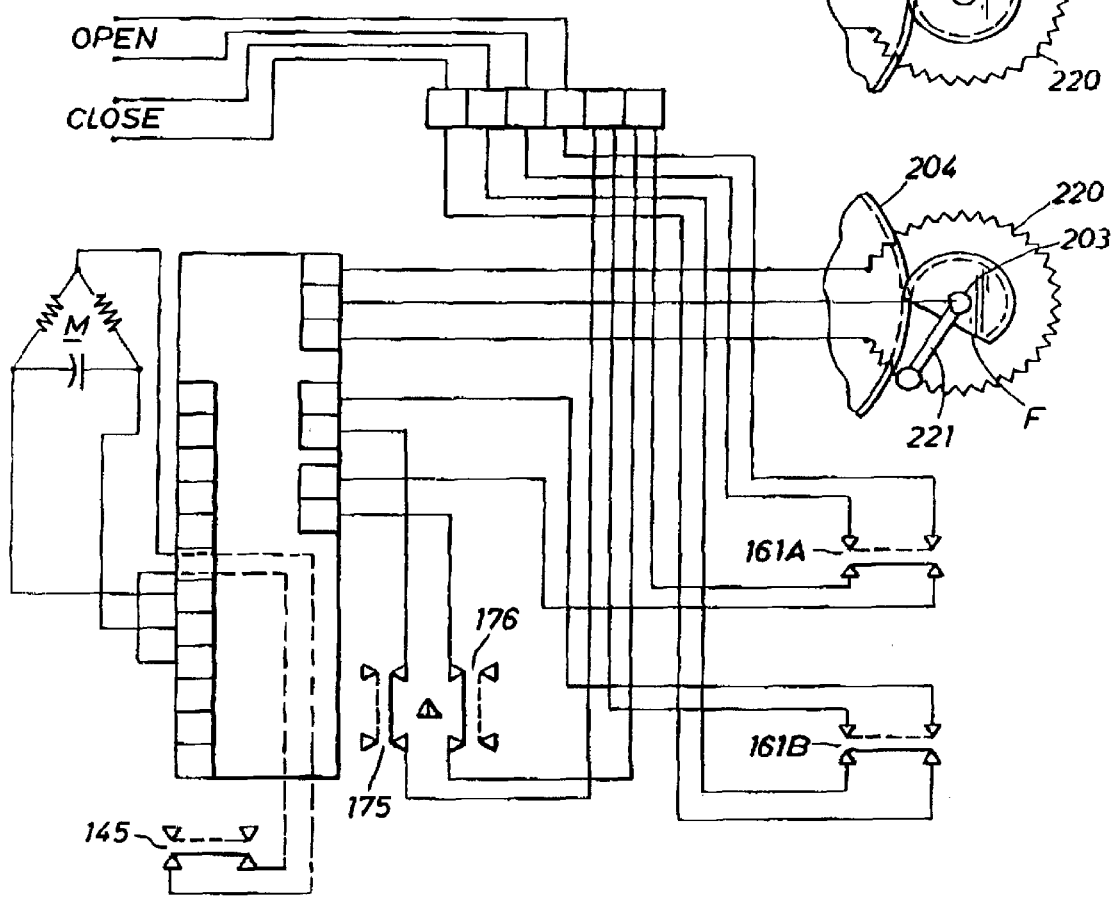

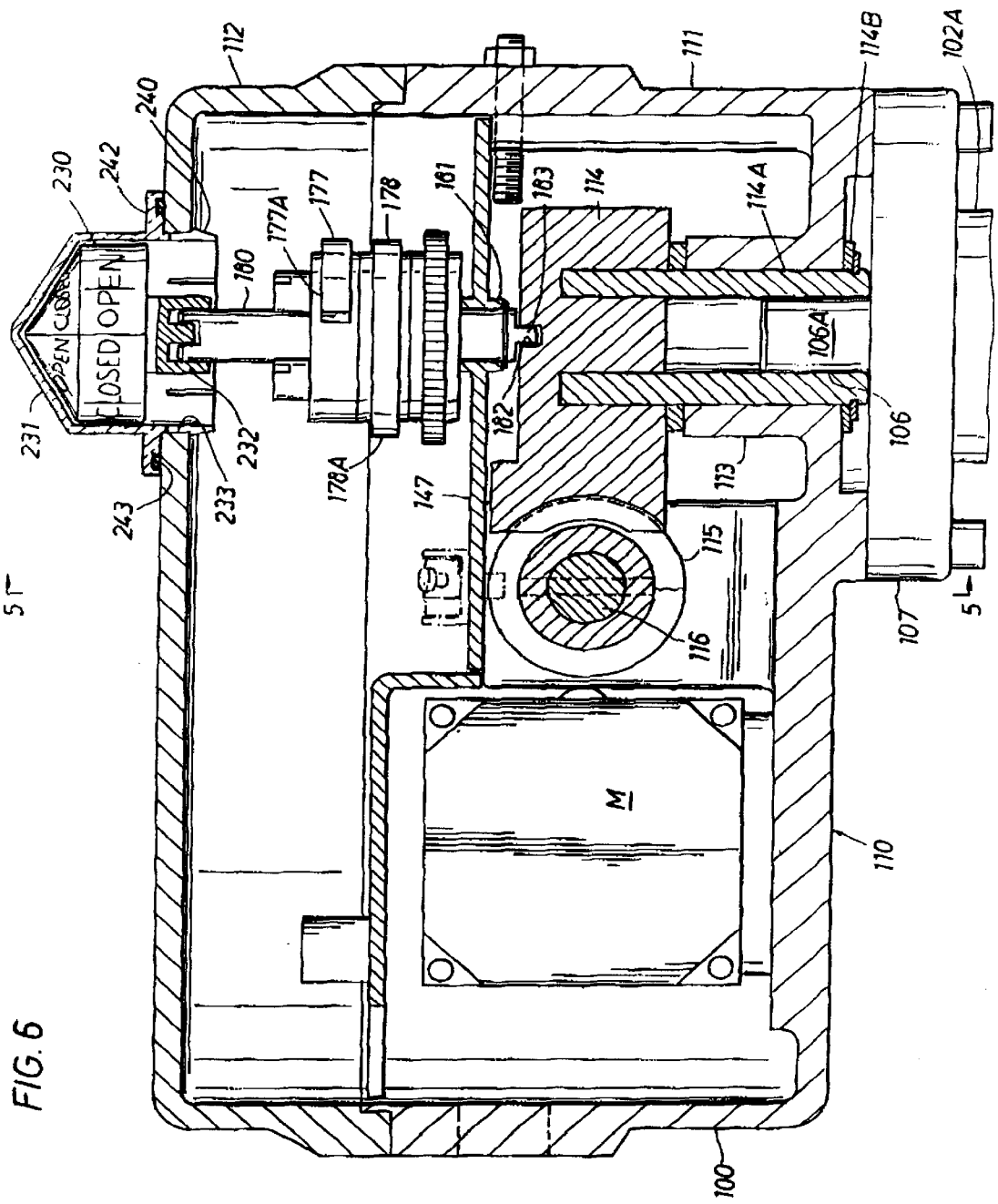

VALVE ACTUATOR

This application is a divisional of U.S. application Ser. No. 08/603,785, filed Feb. 20, 1996 and entitled "Valve Actuator".

This invention relates generally to an actuator for a rotary type valve, which, for example, may be a butterfly valve in which the valve member is a disc generally rotatable a quarter turn between open and closed position. More particularly it relates to improvements in rotary valve actuators in which the valve member is moved between open and closed position by a reversible electric motor.

A rotary valve actuator of the type contemplated by this invention comprises a housing adapted to be mounted on the valve, a drive system including a worm gear mounted for rotation in the housing and adapted to be releasably connected to the valve stem, when the housing is mounted on the valve, in order to impart rotation thereto, a reversible electric motor in the housing having an output shaft, a worm shaft mounted for rotation and limited reciprocation within the housing, and a means connecting the motor shaft to the worm shaft for rotating the worm shaft and connecting the worm shaft to the worm gear for rotating the worm gear and thus the valve stem in opposite rotational directions to open and close the valve responsive to reverse operation of the motor.

In most prior actuators of this type, the electric motor is adapted to be deactivated in the event of excessive torque on the drive system when, for example, the valve member encounters an obstruction. For this purpose, it has been proposed to mount a worm for rotation with the worm shaft and a cam on the worm shaft adjacent the worm to engage sensors on switches leading to the motor, when the drive system encounters excessive torque, for deactivating the motor. More particularly, the worm and cam are disposed in neutral positions between compressed springs which surround the shaft so that one is further compressed, in response to increased resistance to rotation of the worm gear, to permit a surface on the cam to shift longitudinally into engagement with a sensor which operates a switch to stop the motor.

Preferably, the shaft of the motor and the worm shaft are connected by a pinion gear rotatable with the worm shaft and a spur gear on the motor shaft which maintains engagement with the first pinion gear despite limited reciprocation of the worm shaft. Also, the worm shaft is received for reciprocation and rotation within spaced apart bearings in spaced walls of the housing, and the spring means are compressed between the walls and ends of the assembly.

In the past, this movement of the worm shaft, and thus the torque cam so as to actuate the sensors or switches, has required complicated gearing between them and the shaft. Furthermore, the cam and sensors have been of complex construction and difficult to install as well as adjust or modify for different torque limits. Also, mechanisms of this type for so deactivating the electric motor have not been supplied as optional equipment—i.e., the actuator has either been provided with or without the torque limiting mechanism. Still further, access to such prior mechanisms for purposes of adjustment has been time consuming and difficult.

It is an object of the invention to provide an actuator having a torque limiting device of this type wherein the worm gear and worm shaft are easily and quickly connected and installed, and, as will be described to follow, are of such construction as to cooperate with a manual override system including a handwheel selectively engagable with the shaft to operate the valve upon deactivation of the motor. A still further object is to provide such an actuator in which at least the sensors or switches are easily installed as optional equipment, easily accessible for replacement or repair, of simple and inexpensive construction, and easily adjusted to deactivate the motor at desired torque levels.

In accordance with one novel aspect of the invention, the means engagable by the torque cam to deactivate the motor in response to excessive torque comprise a pair of keys each pivotally mounted on the housing and having a finger which assumes a position opposite a cam surface, and a pair of switches each mounted in the housing in position to be engaged by one of the fingers in order to deactivate the motor, as it is moved by the cam surface upon longitudinal movement of the worm shaft in opposite longitudinal directions in response to torque of sufficient magnitude to overcome a predetermined force and thus shift the cam to one side of its neutral position.

Preferably, a lever is mounted on each of the keys to engage one of the switches, when the key is so moved, with the keys being axially aligned and the sensors and arms being aligned on opposite sides of the keys. As shown, a means is provided to easily and quickly adjust the location of the position of each key relative to the cam surface opposite its finger, and thus the torque at which the motor is deactivated.

In the illustrated and preferred embodiment of the invention, the housing includes a base in which the motor and drive system including the torque cam is disposed, and a switch plate is releasably connected to the base of the housing to cover the drive system. More particularly, the keys and switches of the torque limiting mechanism are mounted on a bracket releasably connected to the wall to support the levers for extension through a hole in the switch plate into a position for engagement by the torque cam.

The manual override assemblies for prior actuators of this type have been of complicated and expensive construction, and, in some instances, have required complex gearing between the handwheel and the worm shaft to prevent rotation of the handwheel while the electric motor is activated. It is therefore another object of this invention to provide a manual override which includes a unique arrangement for engaging with the worm shaft of the drive system in any rotative position of the latter, but disengagable therefrom to automatically deactivate the motor as the manual override is moved toward engaged position with the worm shaft. Thus, the manual override assembly includes a handwheel having a manual override shaft mounted in the housing in alignment with the worm shaft for rotation and reciprocation with respect thereto between first and second longitudinal positions, means connecting the manual override shaft to the worm shaft in order to rotate the shaft, when the stem is in said first position, and for disconnecting the stem from the worm shaft, when in the second position, and means automatically responsive to shifting of the manual override shaft toward its first position to deactivate the motor.

More particularly, the manual override shaft and worm shaft are of such construction as to remain disconnected despite limited reciprocation of the worm shaft responsive to predetermined torque. Preferably, the housing base has an internal cavity opening to one end, and the manual override assembly further comprises a liner in which the manual override shaft is carried and removably mounted within the cavity, the installation of the liner into the cavity serving to pre-compress the springs and thus move the worm gear and cam to their neutral position.

In accordance with another novel aspect of the invention, the inner end of the manual override shaft includes a sleeve having longitudinal slots, and the adjacent end of the worm shaft has at least one protuberance for fitting within a slot, when the handwheel and manual override shaft are moved to one position, and for sliding out of the slot as they are moved to another position, so as to release the worm shaft for rotation, and means are provided for releasably holding the manual override shaft in each of its positions.

In accordance with still another novel aspect of the manual override assembly, a sensor of a switch is mounted on the housing, and a rod mounted in the switch for operation through holes in the switch plate and liner as well as in the sleeve on the outer end of the manual override shaft to dispose the inner end of the rod in the path of the shaft, as it is moved to the other position, to cause the switch to deactivate the motor, and disengaged thereby, when the manual override shaft is moved to its one position, to permit the motor to be activated.

It has also been proposed to automatically activate and deactivate the electric motor of such an actuator by means of limit switches which are engaged by cams rotatable in response to rotation of the valve stem between valve opened and closed position. It is often necessary to adjust the positions of the cams in order to adjust the opened and closed positions of the valve. U.S. Pat. No. 5,305,781, assigned to the assignee of the present application, shows an arrangement of rotatable cams rotatable with the valve stem for engagement with switches to indicate the position of the valve at a remote location. The cams may be adjusted to different rotational positions by knobs which are readily accessible for manual manipulation at one end of the cams. A further object of this invention is to adapt a similar arrangement of cams for use in adjusting the open and closed positions of the valve at which the motor to be deactivated, and, more particularly, an actuator which permits access to the cams for adjustment merely upon removal of a cover adapted to be installed over for the base of the actuator housing.

Thus, in accordance with yet a further novel aspect of the invention, first and second axially spaced plates surround and are releasably fixed to a shaft rotatable with the valve stem, a first ring closely surrounds the first plate for rotation with respect thereto and has a circle of teeth formed about the interior thereof, and a second ring closely surrounds the second plate for rotation with respect thereto and has a circle of teeth formed about its interior. More particularly, each ring has an outer cam surface thereabout eccentric to its axis of rotation, and first and second switches are mounted on the switch plate in the housing in position to be engaged and activated by the cam surfaces on the first and second rings, respectively, during rotation of the shaft so as to stop the motor as the stem reaches open or closed position. The positions of the cams, and thus the starting and stopping of the motor, is easily adjusted by means of first and second rods mounted on the plates for rotation about axes parallel to the axis of rotation of the shaft, a pinion gear on the first rod engaging the circle of teeth of the first ring, a pinion gear on the second rod engaging the circle of teeth of the second ring, and manually manipulative means on the ends of rods outwardly of one of the plates so as to permit adjustment of the rotation position of the cam surfaces by knobs which are accessible upon removal of the cover.

In prior actuators of this type, it has been proposed to sense the position of the disc or other valve member by means of a potentiometer so that a signal representative of the position may be electrically transmitted to a location remote from the valve. For this purpose, the teeth of a pinion rotatable with an external portion of the shaft of the potentiometer on which its wiper blade is secured are engaged by a drive gear mounted for rotation in the actuator housing in response to rotation of the valve between open and closed positions. Since a potentiometer has a useful range through only about 270° of rotation of its shaft, the gear teeth are so related as to rotate the potentiometer shaft through this range in response to only a quarter turn or other range of opening and closing movement of the valve.

However, the interengagement between the drive gear and potentiometer shaft requires careful adjustment to insure accurate results and avoid damage to it by forcing its wiper blade beyond its useful range in one direction or the other. In the past, this has required that the user obtain access to the potentiometer within the actuator housing to adjust set screws which hold the drive gear in a desired rotational position with respect to the potentiometer shaft. One of the objects of this invention is to provide such a valve position indicator which is easy to adjust without risk of damage to the potentiometer, and further in which the desired position of the teeth on the potentiometer gear of the potentiometer shaft are automatically determined upon assembly without the need for set screws and the like.

Thus, as in prior actuators of this type, the position of the valve stem is indicated electronically by a potentiometer having a shaft for rotating a pointer past a wiper ring throughout its useful range, and a potentiometer gear about an external portion of the potentiometer shaft and engaging a drive gear rotatable with the valve stem so as to rotate the pointer in response thereto. However, in accordance with another aspect of the invention, a portion of the periphery of the potentiometer gear is free of teeth so that it will not be rotated beyond the useful range of the potentiometer. Thus, the remaining periphery is flat so that the drive gear merely passes by the potentiometer gear on the shaft and not continue to rotate it beyond the useful range of the potentiometer. More particularly, a means for adjusting the rotative position of the drive gear and thus the potentiometer shaft is accessible upon removal of the housing cover. Preferably, the shaft of the potentiometer is out of round for fitting closely within an out of round hole in the potentiometer gear so as to fix their rotational positions with respect to one another.

More particularly, the above mentioned means for adjusting the potentiometer is integrated with the above-described arrangement for deactivating the motor in that the drive gear surrounds a third plate which is fixed to the shaft rotatable with the valve stem and in axially spaced relation to each of the first and second plates, to dispose teeth formed about its exterior in position to engage the gear teeth on the potentiometer shaft. More particularly, a third rod is mounted on the plates for rotation about axes parallel to the axis of rotation of the shaft, a pinion gear on the third rod engages an inner circle of teeth of the ring gear, and means are provided on the end of the third rod outwardly of the one plate for manual manipulation so as to permit adjustment of the potentiometer shaft.

It is also preferred to provide such an actuator with a means for visually indicating the position of the valve, particularly in its opened and closed positions, which is located at or near the valve. Prior indicators have been proposed in which an inner cylinder rotatable in response to the valve stem, and having "opened" and "closed" indicators about its circumference which are representative of the position of the valve, is disposed within an outer cylinder having transparent windows arranged to permit viewing of the indicia from most any location about the valve. In prior actuators, however, these indicators have been difficult to install and to remove for replacement or repair.

In accordance with still another novel aspect of the invention, the position of the valve is indicated by means which includes an opening in the cover opposite one end of the shaft rotatable in response to rotation of the valve stem, and an outer cylinder having detent fingers for passing yieldably through the hole and means thereon engagable with the outer side of the wall when the detent fingers are engaged with the inner side thereof about the hole, and an inner cylinder for releasably engagement with the shaft for rotation therewith and disposal within the outer cylinder, the outer cylinder having transparent windows and the inner cylinder having indicia thereabout visible through the windows for indicating the disposal of the valve in open and closed positions. More particularly, the means engagable with the outer wall includes a flange about the outer cylinder having a groove and a seal of resilient material carried within and protruding from the groove to form a seal with the outer wall of the housing and maintain the detent fingers tightly against the inner side of the wall.

As shown, the worm gear connectable to the valve stem so as to rotate the valve between open and closed positions has shoulders at opposite ends of a partial circle of teeth for engaging the worm, and stops are mounted on and extend into the housing in position to be engaged by the shoulders to prevent over travel of the gear in either direction. More particularly, the stops are threaded to the housing so that they may be adjusted from outside the housing to move their surfaces to positions for engagement by the shoulders in different rotational positions of the gear.

As above-described, those parts of the actuator which seldom require repair or adjustment, such as the motor, worm gear, and worm shaft with worm gear and cam thereon are mounted within the base of the housing beneath the switch plate. Those parts, such as the potentiometer, torque limit keys, and various switches, which require more frequent adjustment or repair, are above the switch plate and thus accessible merely upon removal of the cover. Furthermore, since the handwheel and related parts of the override assembly are quickly and easily assembled within the cavity in an outer wall of the housing, the assembly may, like the torque sensing keys, be an optional feature.

In the drawings, wherein like reference characters are used throughout to designate like parts:

FIG. 1 is an end view of an actuator constructed in accordance with the present invention and mounted on a butterfly valve for use in moving the disc thereof between opened and closed position;

FIG. 2 is a view of the actuator and valve of FIG. 1 as seen from the right-hand side thereof;

FIG. 5 is a vertical sectional view of the actuator, on an enlarged scale, and as seen along broken lines 5—5 of FIG. 6;

FIG. 5B is a vertical sectional view of the potentiometer and drive gear, as well as the cams for engaging the limit switches for stopping the motor in each of its valve opening and closing positions, as seen along broken lines 5B—5B of FIG. 5A;

FIG. 6 is an enlarged vertical sectional view of the actuator, as seen along broken lines 6—6 of FIG. 5;

Figure 3:
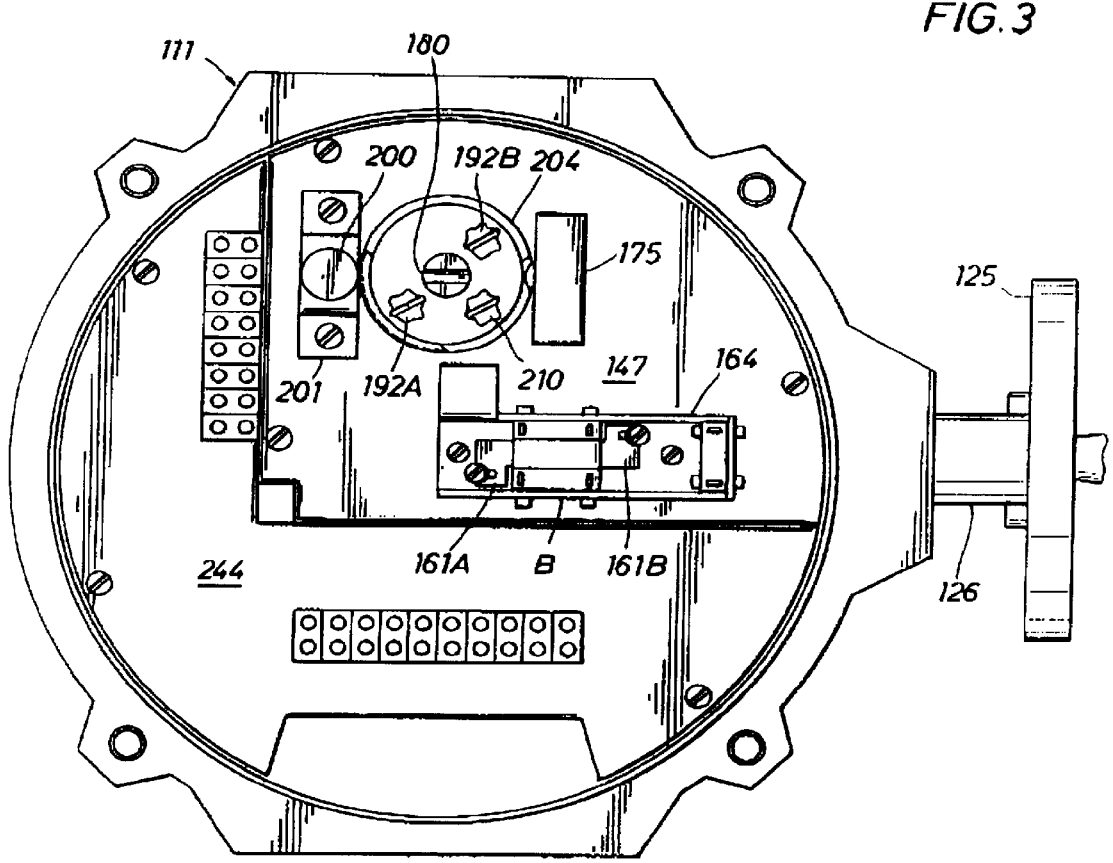
FIG. 3 is top view of the actuator, on an enlarged scale, with the cover removed from the base of the housing, as seen along broken lines 3—3 of FIG. 1; and with the handwheel withdrawn to move the manual drive system to engaged position.

FIG. 12 is a diagram of the electrical wiring within the actuator, showing its connections to various switches as well as a diagrammatic illustration of the pointer and wiper blade of the potentiometer; and FIG. 12A is another diagrammatic illustration of the pointer and wiper blade with the pointer moved to another position responsive to rotation of the ring gear fixed to the shaft rotatable with the valve stem.

With reference now to the details of the above-described drawings, the actuator, which is designated in its entirety by reference character 100, is shown in FIGS. 1 and 2 mounted on a butterfly valve indicated in its entirety by reference character 101. As also shown therein, the butterfly valve comprises a body 102 having a passageway 103 therethrough connected in alignment with a pipeline 104 or other flow conduit, and a disc 105 on mounted for rotation a quarter turn or 90° within the valve body between opened (FIG. 1) and closed positions.

A stem 106 for rotating the disc is connected thereto at its lower end and extends upwardly through a neck 102A of the valve body for connection at its outer end with a drive mechanism within the actuator for so rotating the valve stem and the disc. A flange 107 on the valve body neck is connected to the lower side of a base 111 of the housing 110 of the actuator by bolts or other suitable means, and a cover 112 is releasably connected over the open upper end of the base.

The base of the housing is a casting having a boss 113 on its bottom wall on which a worm gear 114 of the drive mechanism of the actuator is mounted. The worm gear in turn has a sleeve 114A extending downwardly from its lower side and closely into the boss in position to receive the upper end of the stem of the valve. The ends of the stem and sleeve have mating non-circular surfaces which permit the worm gear to impart rotary motion to the valve stem in opposite directions. The worm gear is held down in supported position on the boss by means of a washer 114B retained by a snap ring about the lower end of the sleeve.

The worm gear and thus the valve stem are adapted to be rotated in opposite directions in response to a reversible electric motor M which is connected to the worm gear by a worm 115 carried by a worm shaft 116 supported in the housing for rotation and longitudinal reciprocation traversely of the axis of rotation of the worm gear. Thus, the shaft is received through and supported toward opposite ends by means of bearings 118 and 119 mounted within openings in spaced apart upstanding walls on the lower side of the housing base. The worm is connected to the shaft by a pin 117 which extends through them.

Figure 4:
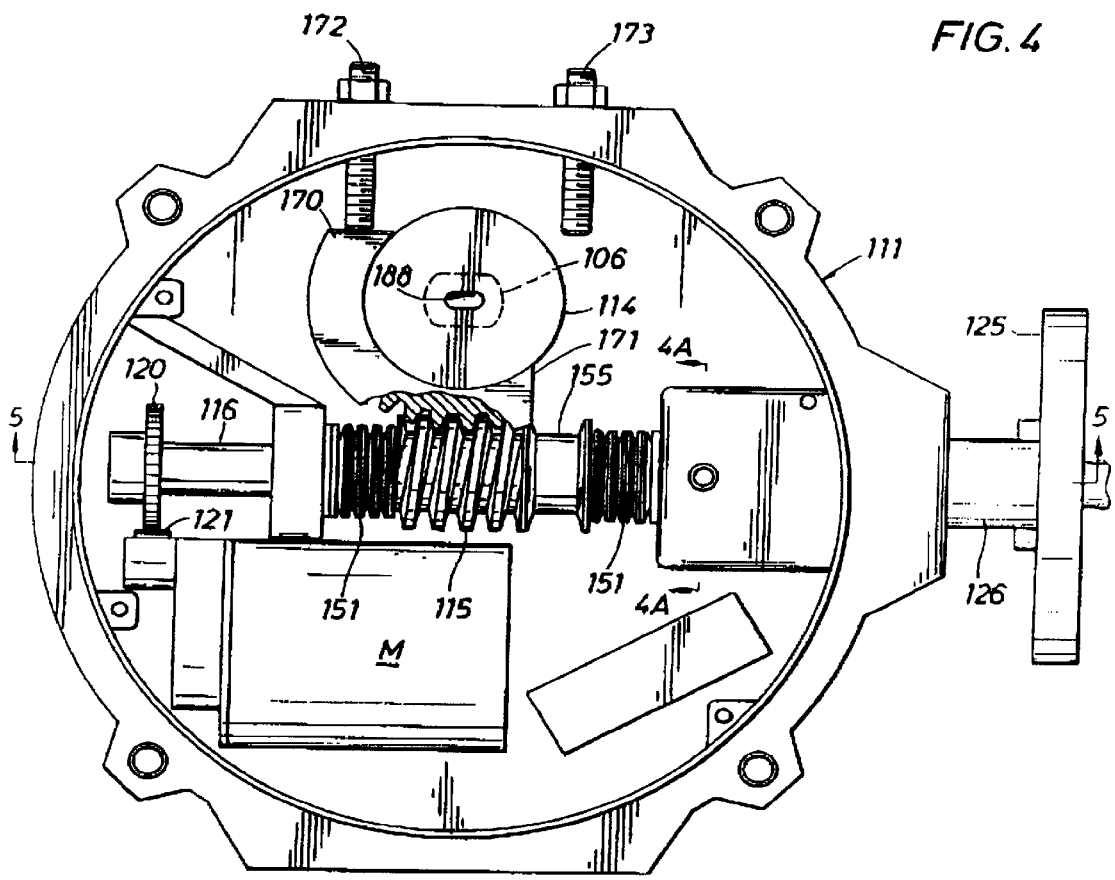
FIG. 4 is another top view similar to FIG. 3, but with the inner wall (switch plate) removed from over the upper open end of the base of the housing.

A spur gear 120 is releasably connected to the end of the shaft 116 for driving connection with a motor gear 121 driven by the output shaft of the motor, as shown in FIG. 4, whereby operation of the motor in one direction will in turn rotate the worm shaft, worm and worm gear, and thus the valve stem, in one direction, while operation of the electric motor in the opposite direction will in turn rotate the valve stem in the opposite direction, thus selectively moving the valve between opened and closed positions. In a manner to be described to follow, the worm and the shaft on which its mounted, are free to move longitudinally a limited extent, and, for this purpose, and again as shown in FIG. 4, the motor gear 120 is sufficiently wide to maintain driving engagement with the spur gear 120 on the worm shaft during any such movement.

Figure 5A:
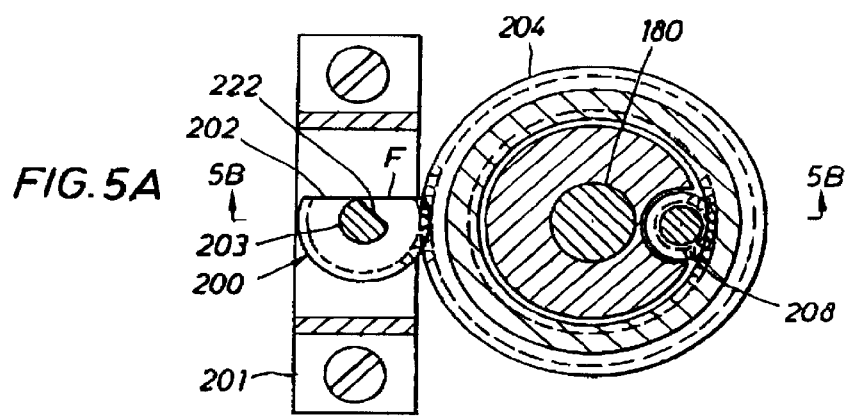
FIG. 5A is a cross-sectional view of the potentiometer and the drive gear for operating the potentiometer gear on its shaft, on an enlarged scale, and as seen along broken lines 5A—5A of FIG. 5B.

A manual override system for the actuator is mounted on the housing base at the right-hand end of the worm shaft 115 and includes an external handwheel 125 mounted on the outer end of a stem 126 whose inner end is in turn mounted for reciprocation within a cavity 127 formed in the right-hand end of the housing base for shifting between an inner position (FIG. 5) in which the manual override is disengaged and an outer position (FIGS. 7 and 8) in which the manual override is engaged. More particularly, the right-hand end of the-worm shaft and the inner end of the stem are so constructed that, as will be described to follow, the shaft is free to move a limited extent longitudinally without engaging the manual override during the electric motor driven sequence of the actuator.

Figure 7:
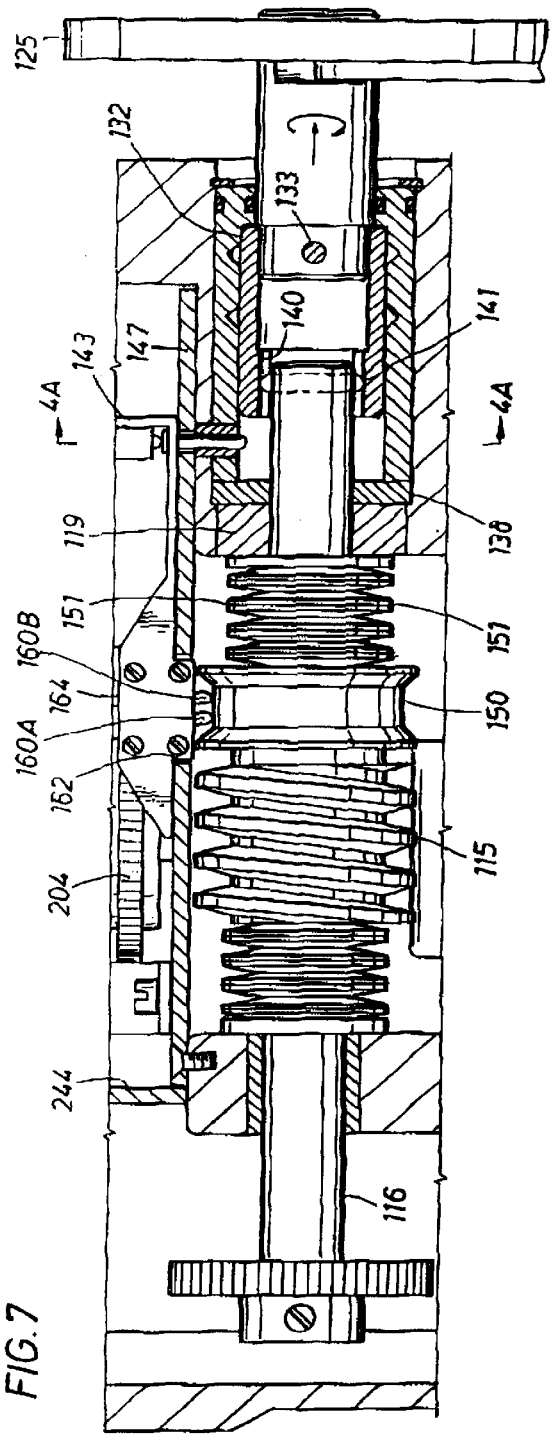
FIG. 7 is a view of the actuator, partly in plan and partly in elevation, as seen generally along broken lines 7—7 of FIG. 5, showing the worm and override cam in neutral positions, as in FIG. 5, and thus during operation of the valve in the absence of excessive torque, shown with override engaged.
Figure 8:
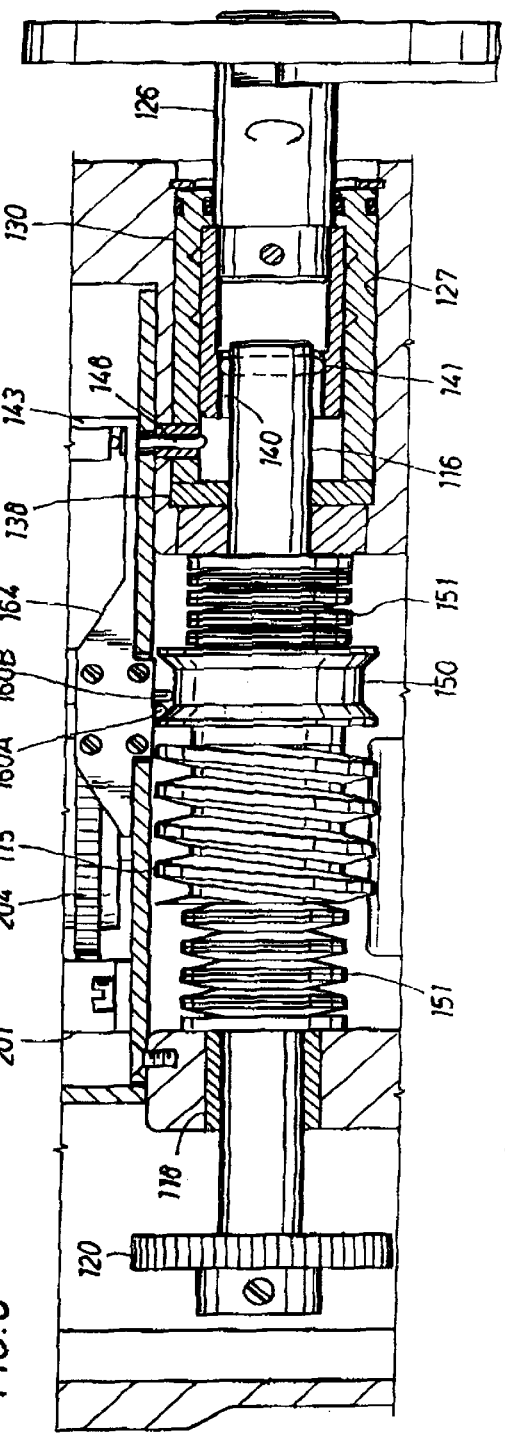
FIG. 8 is a view similar to FIG. 7, but wherein excessive torque, due for example to an obstruction in the line of the valve, has moved the worm and cam right to rotate one of the sensing fingers and thus deactivate the motor, shown with override engaged.

As best shown in FIGS. 5, 7 and 8, the manual override system includes a liner 130 which is releasably held within the cavity 127 in the right-hand of the housing base by means of a snap ring 131, and surrounds a sleeve 132 on the inner end of the stem by means of a pin 133 extending through them. Alternatively, the sleeve may be an integral part of the stem. More particularly, the sleeve is of a size to receive the right-hand end of the worm shaft, and the liner engages a shoulder on a plate 138 within the cavity to locate bearing 119 through which the right-hand end of the worm shaft extends.

The handwheel 125 is held in either of its engaged or disengaged positions by means of ball detents 135 which are spring pressed into one of longitudinally spaced grooves 136 and 137 about the inner diameter of the liner. Seal rings are disposed about the outer and inner diameters of the outer end of the liner to prevent the passage of debris into the interior of the actuator.

Figure 4A:
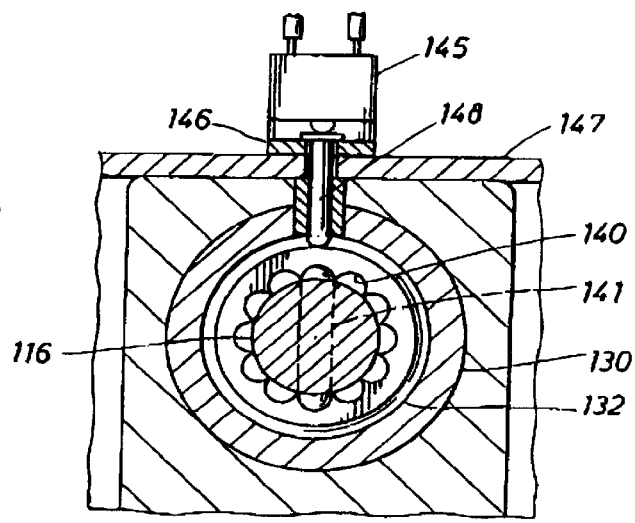
FIG. 4A is a cross-sectional view of the manual override assembly, on an enlarged scale and as seen along broken lines 4A—4A of FIG. 4.

As best shown in FIG. 4A, the inner diameter of the sleeve has a series of arcuate slots 140 formed about its left-hand end, and a pin 141 is slidably received through the right-hand end of the worm shaft to dispose its outer protruding ends in position to fit within radially opposite slots in the sleeve. When the handwheel is pulled outwardly, as shown in FIGS. 7 and 8, the ends of the pin fit within a pair of the slots so as to provide a rotary driving connection between the handwheel and worm shaft for in turn manually driving the worm gear and thus rotating the valve stem. However, upon inward movement of the handwheel and stem, the drive pin moves out of the slots, as shown in FIG. 5, to free the worm shaft 116 from rotation by the handwheel.

The manual override system also includes a means for automatically deactivating the electric motor prior to movement of the override into its engaged position. For this purpose, a switch 145 is mounted above the upper side of the base of the actuator housing in position to be actuated so as to deactivate the motor as the override shaft 132 is moved outwardly with the handwheel to the position of FIGS. 7 or 8. Then, upon return of the override shaft to its inner position disengaged with the worm shaft, the sleeve 132 will trigger the switch so that it will be positioned for again deactivating the motor in the event the operator decides to engage the manual override. The switch is mounted on a bracket which in turn is mounted on an inner wall 147 of the housing which is bolted or otherwise secured to the open upper side of the housing base to cover a recessed portion of the housing base. As also previously described, it serves as a switch plate, and with other walls of the housing base, encloses a lower compartment below it for those parts not normally requiring access by the operator and with the cover 112, and upper compartment enclosing those parts which may require adjustment or repair, merely upon removal of the cover 112.

The switch itself is adapted to be activated by a rod 148 which extends through aligned holes in the inner wall and housing base as well as through the liner 130 to dispose its lower end for engagement by the override shaft 132. Thus, the rod is held upwardly by the override shaft when the manual override is in its disengaged position, to close the switch so as to enable the motor to operate. On the other hand, when the sleeve is shifted to the right by movement of the handwheel to engaged position, the rod is spring pressed downwardly to open the switch. The end of the override shaft is beveled to facilitate its cooperation with the inner end of the rod.

As will be seen from a comparison of FIGS. 7 and 8, the pin 141 maintains its engagement with a pair of slots despite limited longitudinal movement of the worm shaft with respect to the housing, and thus with respect to the manual override shaft which is mounted in the housing, in response to excessive torque, as will be better understood from the description to follow.

The worm shaft is also surrounded by a cam 150 which, as shown, is formed integrally with the right end of the worm, although it may be separate therefrom, so that it, like the worm, is fixed to the shaft. The worm shaft is also surrounded by two sets of Bellville springs 151, one of which is precompressed between the left-hand end of the worm and the wall of the housing base in which the left bearing 118 is mounted and the other of which between the right-hand end of the cam and the right-hand bearing 119 mounted in the opposite wall of the actuator housing base.

As previously described, during normal operation of the actuator, these springs are precompressed to maintain the worm and cam, and thus the worm shaft to which they are fixed, in a "neutral" position wherein each set of springs is equally compressed. However, in the event the valve encounters excessive torque, as for example when there is an obstruction in the line, the resulting resistance to rotation is transmitted through the worm and cam to cause one of the sets of the springs to be further compressed, such as the right-hand set shown in FIG. 8, in the event of a resistance of opening movement of the valve. On the other hand, in the event the resistance is closing the valve, the left-hand set of springs may be compressed.

In the assembly of the valve, with the manual override system removed from the cavity in the base of the housing, the worm and cam, together with both sets of springs, are axially aligned with the spaced bearings in the housing to permit the worm shaft 116 (with the spur gear 120 removed from its left end) to be inserted through the cavity, right-hand bearing, worm, cam, springs, and left-hand bearing. Thus, upon installation of the manual override system, bearing plate 138 at the left end of the sleeve and liner 130 will apply force to the right-hand bearing 119 to compress the springs so that, upon connection of the liner in the cavity, the worm and cam are held in a neutral position.

All of this is done, of course, prior to installation of the worm gear into engagement of the worm, and, of course, optional installation of the torque limiting sensors (to be described) into the positions shown in FIGS. 5, 7 and 8, from above the inner wall of the housing. Also, of course, the spur gear 120 would be connected to the left end of the worm shaft for driving engagement with the gear of the motor.

As previously described, the means for deactivating the motor, and thus preventing destruction of the obstructed valve disc, in response to a pre-determined torque, comprises tapered cam surfaces 155A and 155B (see FIGS. 9 to 11) about the cam, and a pair of keys 160A and 160B mounted on a bracket B secured to the inner wall of the housing. A finger of one key is thus disposed in position to be engaged by one cam surface, in the event of excessive torque during movement of the valve stem in one direction, and the other to be engaged by the other cam surface in the event of excessive torque during movement of the valve stem in the opposite direction. More particularly, a pair of switches 161A and 161B are also mounted on the bracket each in position to be engaged by one of the keys so as to deactivate the motor when the finger of that key is pivoted to a predetermined extent due to engagement therewith of one of the cam surfaces.

Figure 9:
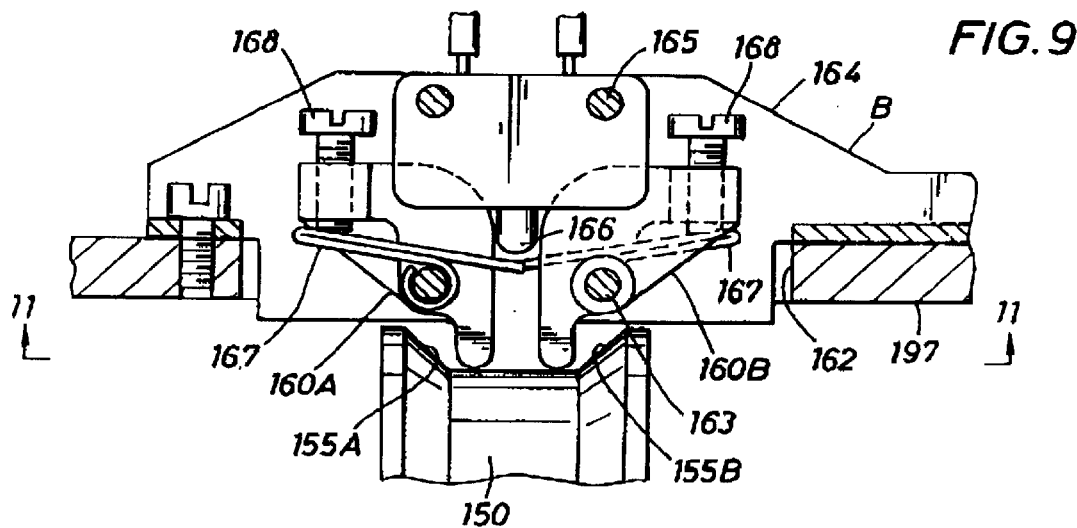
FIG. 9 is an enlarged view of the torque sensing mechanism, as seen along broken lines 9—9 of FIG. 11, and showing its fingers in a dependent position opposite cam surfaces on the cam carried by the worm.
Figure 10:
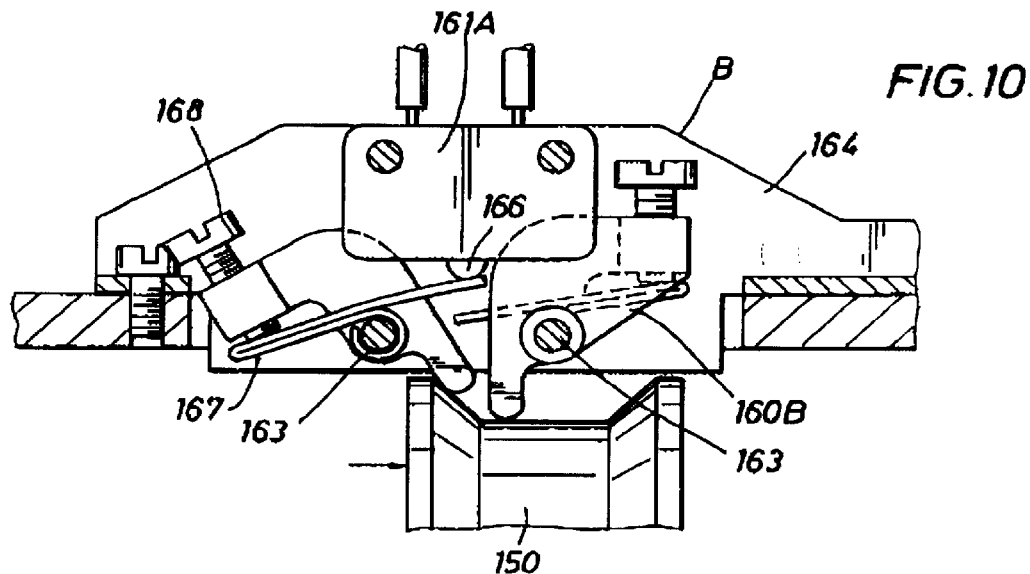
FIG. 10 is a view similar to FIG. 9, but wherein the cam has been shifted with the worm to the right so as to engage and move the finger of the left-hand sensing key in order to deactivate the motor, as shown in FIG. 8.
Figure 11:
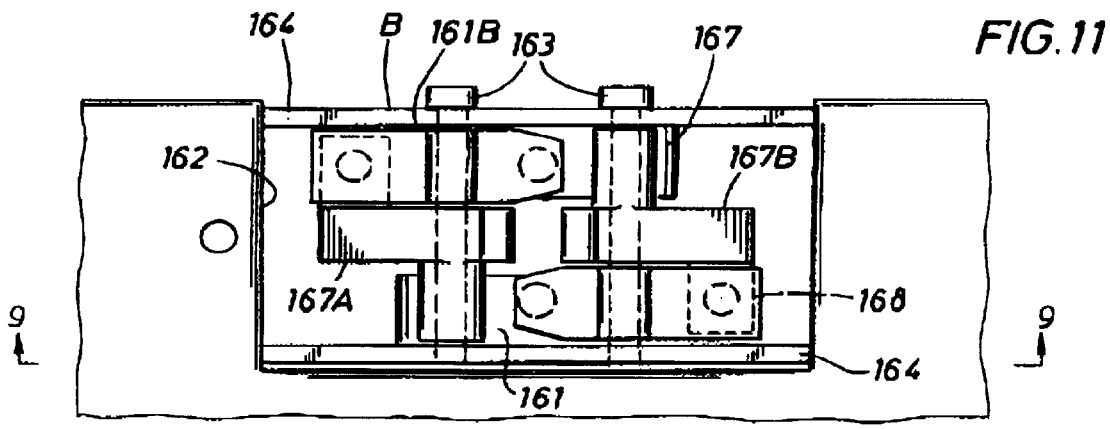
FIG. 11 is a view from the bottom of the torque sensing device, as viewed along broken lines 11—11 of FIG. 9.

Thus, the bracket B is disposed over an opening 162 formed in the inner wall of the base of the housing to permit the fingers of the keys to depend therethrough into positions intermediate the cam surfaces on the cam, as shown in FIGS. 9 to 11. More particularly, each key is pivotally mounted on the bracket by a pin 163 extending therethrough and mounted at opposite ends on opposite walls 164 of the bracket. The switches are fixedly mounted on the bracket by means of pins 165 which extend through them and the opposite walls of the bracket each, with a button 166 thereon disposed for engagement with a key as the key is pivoted a predetermined extent by one of the cam surfaces.

Thus, as shown in FIG. 11, the keys and switches are laterally spaced apart with each being adjacent to one side wall of the bracket. Lever arms 167A and 167B are disposed about the key shafts intermediate the keys and switches, so that a free end thereof is disposed beneath a switch button, as shown in FIG. 9, when the arm is unstressed, so that the finger is merely disposed in position to be engaged by a cam surface. However, when the key is pivoted upon engagement of the cam surface with its finger, the free end of the arm is moved upwardly to depress the switch button and thus activate the switch, when the key has been swung to a predetermined extent by the longitudinal movement of the cam surface with the worm shaft, and thus deactivate the motor. As shown, the arms are aligned so as to minimize the width of the bracket.

As also shown, the end of each lever arm is disposed opposite a screw 168 mounted on each key, whereby the screw may be adjusted to adjust the force at which the switch engaged by the arm is activated.

As also previously described, one of the novel features of the present invention is the ability of the user of the actuator to either incorporate or do without the above described mechanism for deactivating the motor in the event of excessive torque. Thus, if it is to be used, it is merely necessary to mount the bracket in the position shown and releasably connect it to the inner wall by means of screws, thus moving the depending fingers of the keys through the hole in the inner wall into positions opposite the cam surfaces. If this torque limiting feature is not to be used, the combined cam and worm could be replaced by a worm, and the bracket with the sensing fingers would not be installed. A blank bracket could be used to cover the opening in the switch plate. As shown, the bracket for the shut off switch 145 of the manual override mechanism is also mounted on the flange on the same bracket.

As best shown in FIG. 4, gear teeth are disposed only about that portion of the worm gear 114 which, during operation of the actuator, is engaged by the worm on the worm shaft. Shoulders 170 and 171 are formed on peripherally spaced portions of the remainder of the circumference of the worm gear at opposite ends of the teeth in position to be engaged by the inner ends of bolts 172 and 173 threadably connected through holes in one side of the base of the actuator housing. As shown in FIG. 4, these bolts are held in place by nuts which permit the user of the actuator to adjust the inner ends of the screws, and thus the positions at which the worm gear, and thus the stem of the valve would be stopped in an emergency situation—i.e., in which the actuator was otherwise free to continue to rotate the valve stem beyond its desired open or closed position.

As previously described, switches are mounted within the actuator in position to be actuated so as to deactivate the motor, in response to rotation of the valve stem and thus the valve member into one of its positions. More particularly, and as best shown in FIGS. 3 and 5, upper and lower limit switches 175 and 176 are mounted in vertically spaced relation on the inner wall of the base of the housing with sensors thereon disposed opposite similarly spaced upper and lower cam rings 177 and 178, respectively, surrounding and rotatable with an upper shaft 180 rotatable with the gear 114 of the drive mechanism, and thus in direct response to rotation of the valve stem. As shown in FIG. 5B, this cam shaft extends closely through a sleeve 181 in the inner wall 147 for releasable connection at its lower end to the worm gear. Thus, the upper side of the worm gear has a slot 182 which is adapted to closely receive a tongue 183 on the lower end of the cam shaft so that the shaft and cam rings mounted thereon may be removed or replaced from within the upper housing compartment without removing the inner wall.

As shown, each of the cam rings has a cam surface 177A and 178A formed about its periphery opposite one of the limit switches. With the valve being rotatable a quarter of a turn, these cams have their high sides rotationally displaced about 90°. Assuming that the upper cam ring 177 is the valve closing cam, and as shown in FIG. 5, its high point will activate the upper limit switch 175 as the valve is moved to open position in response to rotation of the worm gear with the valve stem in one rotational direction. Then, upon return movement of the valve to its closed position, the high point on the lower cam ring 178 will move approximately 90° so as to actuate the lower switch 176 for deactivating the motor as the valve reaches its closed position in response to rotation of the worm gear with the valve stem in the opposite rotational direction. As indicated on the diagram, the switches may be closed to reactivate the motor and thus return the valve to open or closed position, by switches activated externally of the actuator.

As previously described, this assembly for actuating the limit switches is similar in construction to that shown in the aforementioned. U.S. Pat. No. 5,305,781 wherein similar cam rings are used to supply an indication of the position of the valve at a remote location. Hence, as in the prior patent, it provides a unique arrangement for independently adjusting the rotational position of each cam ring, when required, merely upon removal of the cover of the housing from the base thereof. Thus, the cam rings are supported on and rotatable with the cam shaft 180 and have gear teeth 190A and 190B about their inner periphery which are engaged with pinion gears mounted on rods 191A and 191B extending upwardly to knobs 192A and 192B on the upper end of the assembly, the knobs thus providing a means which the cam rings may be manually adjusted. The rods also extend through plates 193A and 193B which are fixed to the shaft by pins 194A and 194B and through which the rods extend. More particularly, these plates are disposed above and below each of the cam rings and are received through recesses in spacer plates disposed between the other plates.

As also previously described, the location of the valve is adapted to be remotely observed by a means which includes a potentiometer 200 mounted on the inner wall 147 of the base of the housing by means of a bracket 201 releasably connected thereto, and a potentiometer gear 202 rotatable with the external lower end of the potentiometer shaft 203 for movement by a drive gear 204 disposed opposite thereto and rotatable in response to the valve stem. More particularly, in accordance with another novel aspect of the invention, this drive gear 204 is mounted on the same shaft 180 on which the cam rings are mounted by a plate 205 which it closely surrounds and which is fixed to the shaft by means of a pin 207. Teeth formed about the inner periphery of drive gear 204 engage a pinion gear 208 which is mounted on the lower end of a rod 209 which, like the cam ring adjusting rods, extends between a knob 210 on its upper end and the pinion gear which rotates within in a recess in a spacer plate above the mounting plate 205 and below the spacer plate for the lower cam ring 178. This then permits the ring gear to be rotated in either direction from a readily accessible location above the inner wall of the base of the housing, and thus to correct any out of adjustment of the potentiometer without the need for access to and manipulation of set screws and the like, as was the case in the prior art.

The container for the potentiometer, which is properly oriented on the bracket by a tab on its side adapted to fit closely within a slot in the bracket, may be of conventional construction having, as shown diagrammatically in FIGS. 12 and 12A, a wiper ring 220 over which a pointer 221 mounted on the potentiometer shaft 203 is adapted to move to vary the output of the potentiometer and thus remotely indicate the position of the valve. For this latter purpose, the end of the potentiometer shaft has a flat side 222 (FIG. 5A) forming an out of around configuration adapted to fit closely within a hole in the potentiometer gear rotatable with the shaft so as to permit the pointer to properly relate the wiper to the rotational position of the valve.

As previously indicated, and as well known in the art, a potentiometer has a useful range of only about 270°. Thus, in response to rotation of the valve 90° between open and closed positions, the pointer will swing through approximately 270°. This is accomplished of course by a suitable ratio between the teeth of the ring gear to those on the pinion gear on the shaft of the potentiometer.

In accordance with another novel aspect of the invention, the side F of the partial gear on the potentiometer shaft is flat intermediate the teeth thereabout adapted to engage the ring gear during rotation of the pointer throughout the active range of the potentiometer. As a result, the partial gear cannot rotate the potentiometer out of its active range, since its teeth will first move out of engagement with the potentiometer gear. This, of course, is true of rotation of the partial gear whether during opening or closing of the valve. As previously described, this eliminates the possibility of a false signal emanating from the valve actuator.

The means for indicating the position of the valve at or about its location comprises an inner cylinder 230 having "opened" and "closed" indicia about its circumference and its upper conical end and releasably mounted on the upper end of the shaft 180 on which the above described cam rings are mounted. An outer cylinder 231 is mounted on the top wall of the cover of the housing in position to surround the inner cylinder to permit viewing of the indicia on the inner cylinder. Thus, as shown, the outer cylinder has windows so arranged about its circumference, as well as about its conical upper end, as to permit the viewer to observe the position of the valve as indicated by the position of that indicia in response to rotation of the shaft, as shown in FIGS. 5 and 6.

More particularly, the inner cylinder has a stem 232 on its lower end having transverse slots adapted to closely receive transverse protrusions at the upper end of the shaft 180 on which the cam rings and gear ring are mounted to cause it to be rotated with the shaft and thus with the valve stem. Thus, the lower end of the inner cylinder may merely be moved downwardly through an opening 233 to engage the upper end of the shaft which automatically coordinates the "opened" or "closed" indicia thereon with corresponding positions of the valve. Obviously, other indicia may be used to indicate open or closed positions. The cylindrical and upper conical portions of the outer housing fit closely to corresponding portions of the inner cylinder when the outer cylinder is releasably mounted on the cover of the housing, and with the windows arranged opposite the indicia. For this latter purpose, the lower end of the outer housing has spring fingers 240 or detents adapted to fit closely through the opening in the cover to permit their lower ends 241 to snap beneath the inner side of the cover as they move through the opening in the cover. More particularly, there is a flange 242 about the outer housing which engages its upper side as the detents move into position.

There is a flange which contains an elastic seal ring 243 of such size as to normally protrude from the lower side of the flange. Thus, it serves not only to form a seal or at least a debris barrier between the outer cylinder and the cover, but also to yieldably urge the outer cylinder upwardly and thus hold the detents tightly engaged with the inner side of the cover.

As shown in FIG. 3, the base of the housing includes a second inner wall 244 which is disposed over the lower compartment of the base not covered by the first inner wall. This wall, like the first wall, is adapted to be fastened to the open upper end of the base. It has banks of switches mounted thereon and serves, along with the other inner wall, to separate the upper and lower compartments of the housing from one another, and, more particularly, to enclose certain of the more permanent components of the actuator, including the motor and associated wiring. The wall 147, when in place, covers other parts which do not require frequent replacement, such as the worm shaft, worm and cam, as well as the Bellville springs mounted on the shaft, the worm gear, and the stops. Parts of the actuator which, on the other hand, may require adjustment, are accessible for that purpose above the inner walls when the cover is removed from the housing base. This, of course, includes the knobs on the upper ends of the rods leading to the cam rings as well as the drive gear for adjusting the potentiometer, the torque sensing apparatus, the potentiometer itself, as well as the safety switch and limit switches.

The wiring diagram of FIG. 12 includes a diagrammatic illustration of the partial gear on the potentiometer shaft and the drive gear for adjusting the potentiometer, as well as the proximity switches responsive to the opening and closing cams, and the switches responsive to the torque response keys. FIG. 12A shows the partial gear of the potentiometer shaft moved from the position of FIG. 12. Wiring is also shown for connecting the potentiometer to a remote position indicator extension of the housing.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A rotary valve actuator, comprising
a housing adapted to be mounted on the valve and having an opening in an outer wall thereof,
means within the housing for rotating the valve stem between positions opening and closing the valve, including
a shaft having one end mounted opposite the housing opening and rotatable in response to rotation of the stem,
an outer cylinder having detent fingers for passing yieldably through the opening and means thereon engagable with the outer side of the outer wall, when the detent fingers are engaged with the inner side thereof about the opening, and
an inner cylinder within the outer cylinder releasably engaged with the one end of the shaft for rotation therewith,
said outer cylinder having windows and said inner cylinder having indicia thereabout visible through the windows for indicating the disposal of the valve in open and closed positions.

2. As in claim 1, wherein
the means engagable with the outer side of the outer wall includes a flange about the outer cylinder, and
a seal of resilient material protrudes to form a seal with the outer side of the outer wall of the housing and maintain the detent fingers tightly against the inner side of the wall.

3. A rotary valve actuator, comprising
a housing adapted to be mounted on the valve,
means within the housing for rotating the valve stem between opened and closed positions,
a shaft rotatable with the stem and having a drive gear thereabout, and
means for indicating the position of the valve stem, including a potentiometer having a shaft for rotating a pointer past a wiper ring throughout its useful range, and
a potentiometer gear arranged symmetrically about a portion of the potentiometer shaft for rotation therewith and having teeth for engaging the drive gear on the shaft so as to rotate the pointer in response to rotation of the shaft,
the remainder of the periphery of the potentiometer gear being free of teeth so that it will not be rotated by the drive gear beyond the useful range of the potentiometer.

4. As in claim 3, wherein
the shaft of the potentiometer is out of round for fitting closely within an out of round hole in the potentiometer gear so as to fix their rotational positions with respect to one another.

5. As in claim 4, including
means for adjusting the rotative position of the potentiometer ring about the shaft.

6. A rotary valve actuator, comprising
a housing having a base adapted to be mounted on the valve,
a reversible electric motor mounted for rotation in the housing base,
means for rotating the valve stem between valve open and closed positions in response to operation of the motor in opposite directions, and
means for starting and stopping the motor in the opened and closed positions of the valve, including
a shaft rotatable with the stem,
first and second plates surrounding and releasably fixed to the shaft in axially spaced relation,
a first ring closely surrounding the first plate for rotation with respect thereto and having a circle of teeth formed about the interior thereof,
a second ring closely surrounding the second plate for rotation with respect thereto and having a circle of teeth thereabout,
each ring having an outer cam surface eccentric to its axis of rotation,
first and second switches mounted in the housing in position to be engaged and activated by the cam surfaces on the first and second rings, respectively, during rotation of the shaft, so as to stop the motor in opened and closed positions of the valve, and
first and second rods mounted on the plates for rotation about axes parallel to the axis of rotation of the shaft,
a pinion gear on the first rod engaging the circle of teeth of the first ring,
a pinion gear on the second rod engaging the circle of teeth of the second ring, and
manually manipulative means on the ends of rods outwardly of one of the plates so as to permit adjustment of the rotation position of the cam surfaces on the rings, and including
means for indicating the position of the valve, comprising
a third plate surrounding and fixed to the shaft in axially spaced relation to each of the first and second plates,
a third ring closely surrounding the third plate for rotation with respect thereto and having a circle of teeth formed about the interior thereof,
a potentiometer mounted in the housing and having teeth about its shaft which are engaged with the teeth about the third ring so that a pointer on the shaft is rotated past a wiper ring a distance indicative of the position of the valve, a third rod mounted on the plates for rotation about axes parallel to the axis of rotation of the shaft, a pinion gear on the third rod engaging the circle of teeth of the third gear, and manually manipulatable means on the end of the third rod outwardly of the one plate so as to permit adjustment of the position of the pointer relative to the wiper.

7. A rotary valve actuator, comprising a housing having a base adapted to be mounted on the valve, an interior wall disposable over an open end of the base, and a cover removably mounted on the base to provide access to the housing above the inner wall, a reversible electric motor and a drive assembly within the housing base beneath the inner wall for connecting the motor to the valve stem, means including a potentiometer for indicating the position of the valve, means for adjusting the range over which the potentiometer operates, and means for deactivating the motor when the valve stem reaches its opened and closed positions, and means for adjusting the positions at which the motor is deactivated in response to excessive torque, each of said potentiometer, motor deactivating means, and adjusting means being disposed on the upper side of the inner wall for access upon removal of the cover.

8. A rotary valve actuator, comprising a housing having a base adapted to be mounted on the valve, a reversible electric motor mounted for rotation in the housing base, means for rotating the valve stem between valve open and closed positions in response to operation of the motor in opposite directions, and means for starting and stopping the motor in the opened and closed positions of the valve, including a shaft rotatable with the stem, first and second plates surrounding and releasably fixed to the shaft in axially spaced relation, a first ring closely surrounding the first plate for rotation with respect thereto and having a circle of teeth formed about the interior thereof, a second ring closely surrounding the second plate for rotation with respect thereto and having a circle of teeth thereabout, each ring having an outer cam surface eccentric to its axis of rotation, first and second switches mounted in the housing in position to be engaged and activated by the cam surfaces on the first and second rings, respectively, during rotation of the shaft, so as to stop the motor in opened and closed positions of the valve, and first and second rods mounted on the plates for rotation about axes parallel to the axis of rotation of the shaft, a pinion gear on the first rod engaging the circle of teeth of the first ring, a pinion gear on the second rod engaging the circle of teeth of the second ring, and manually manipulative means on the ends of rods outwardly of one of the plates so as to permit adjustment of the rotation position of the cam surfaces on the rings.

9. As in claim 8, wherein the shaft has a pair of holes therethrough, the plates have holes therethrough aligned with the holes in the shaft, and pins are received in the holes to fix the plates to the shaft.

* * * * *